United States Patent [19]

Miller

[11] 4,427,374
[45] Jan. 24, 1984

[54] RECIRCULATION DEVICE

[75] Inventor: John W. Miller, Ossian, Ind.

[73] Assignee: Phelps Dodge Industries, Inc., New York, N.Y.

[21] Appl. No.: 294,202

[22] Filed: Aug. 19, 1981

[51] Int. Cl.³ .......................... F24H 1/00; F27D 19/00
[52] U.S. Cl. .................................... 432/48; 236/15 C; 432/222
[58] Field of Search ............ 236/15 BF, 15 BR, 15 C; 432/48, 222

[56] References Cited

U.S. PATENT DOCUMENTS

| | | | |
|---|---|---|---|
| 1,896,910 | 2/1933 | Merkt | 432/48 X |
| 1,926,772 | 9/1933 | Hess | 432/48 X |
| 4,011,041 | 3/1977 | Taylor | 432/222 X |
| 4,060,380 | 11/1977 | Bolt | 432/222 X |

*Primary Examiner*—William E. Wayner
*Attorney, Agent, or Firm*—David A. Lundy

[57] ABSTRACT

A recirculation device for recirculating a selected volume of preheated gas exhausted from a heating chamber in a mixture with fresh air back to the heating chamber. The device comprises a first passageway having an entrance and a pair of exits; a second passageway having a pair of inlets and an outlet; and a third passageway connecting one exit and one inlet. The other exit communicates with a preheated gas exhaust, and the other intake communicates with a source of fresh air. A back pressure damper is secured adjacent the other exit. A manual control assembly is connected to the back pressure damper so that the volume of preheated gas flowing into the preheated gas exhaust may be selectively determined. A mixing damper is secured adjacent the other intake. An automatic temperature dependent control assembly is connected to the mixing damper so that the mixture of preheated gas and fresh air entering the heating chamber is dependent upon the temperature in the heating chamber.

5 Claims, 2 Drawing Figures

4,427,374

RECIRCULATION DEVICE

BACKGROUND OF THE INVENTION

The invention relates to fluid recirculation devices, and in particular, to an exhaust fluid recirculation device for recirculating selected amounts of entering pre-energized fluid to a furnace or oven.

In view of the present so-called energy shortage, there has been much concern expressed about the conservation of energy. One way in which energy has been conserved is through the recirculation of fluids containing energy, or in other words, the utilization of pre-energized fluid.

In particular, in various operations utilizing furnaces wherein heated gas both enters and exits a heating chamber, there exists the opportunity to utilize the already heated gas exiting the heating chamber. Generally, this improves the overall operating efficiency of the furnace. Thus, it would be highly desirable to provide an improved exhaust fluid recirculation device for recirculating selected amounts of entering pre-energized fluid to a furnace or oven.

Devices that recirculate pre-energized fluids such as preheated gas sometimes experience problems with respect to the accurate control of the temperature of the oven into which the pre-energized fluid enters. The flow of pre-energized fluid must be maintained within a proper range. If the volume of flow is too great, the temperature or energy level in the oven will be too high. If the volume of flow is too small, the temperature or energy level in the oven will be too low. Oven temperatures that are too high or too low could lead to inefficient operation of the oven. Thus, it would be highly desirable to provide an improved exhaust fluid recirculation device for recirculating selected amounts of entering pre-energized fluid to a oven that provides relatively accurate control of the temperature within the oven.

Heretofore, devices for recirculating pre-energized fluid have been of relatively complex design. Exemplary of this type of structure is a recirculation device manufactured by Michigan Oven Company. The Michigan Oven devices comprise a wing rotatable heat exchanger wheel within a housing. The wheel is motor-powered and must be closely monitored during operation. Although most certainly satisfactory, this wheel is subject to maintenance costs operational downtime and other general expenses associated with such relatively complex structures. These expenses are higher than desired. Thus, it would be highly desirable to provide an improved exhaust fluid recirculation device for recirculating selected amounts of entering pre-energized fluid to a oven that is of a relatively simple design and which has reduced maintenance costs, reduced operational down time, and reduced overall costs associated with the operation thereof as compared to previous devices.

SUMMARY OF THE INVENTION

Thus, it is an object of the invention to provide an improved exhaust fluid recirculation device for recirculating selected amounts of entering pre-energized fluid.

It is another object of the invention to provide an improved exhaust fluid recirculation device for recirculating selected amounts of entering pre-energized fluid to a oven or furnace that provides relatively accurate control of the temperature or energy level within the oven or furnace.

Finally, it is another object of the invention to provide an improved exhaust fluid recirculation device for recirculating selected amounts of entering pre-energized fluid to a oven or furnace that is of a relatively simple design and which has reduced maintenance costs, reduced operational down time, and reduced overall costs associated with the operation thereof as compared to previous devices.

The invention is an exhaust fluid recirculation device for recirculating selected amounts of entering pre-energized fluid. The device comprises a first passageway which has an entrance and a pair of exits. A second passageway has a pair of inlets and an outlet. A third passageway connects one exit with one inlet. The other exit communicates with a preheated gas exhaust. The other inlet communicates with a source of fresh fluid. A regulator means is provided for regulating the volume of and energy level of fluid entering the oven or furnace.

BRIEF DESCRIPTION OF THE DRAWINGS

The above mentioned and other features and objects of this invention and the manner of attaining them will become more apparent and the invention itself will be best understood by reference to the following description of the invention taken in conjunction with the accompanying drawings wherein.

DETAILED DESCRIPTION OF A SPECIFIC EMBODIMENT

Figure 1:
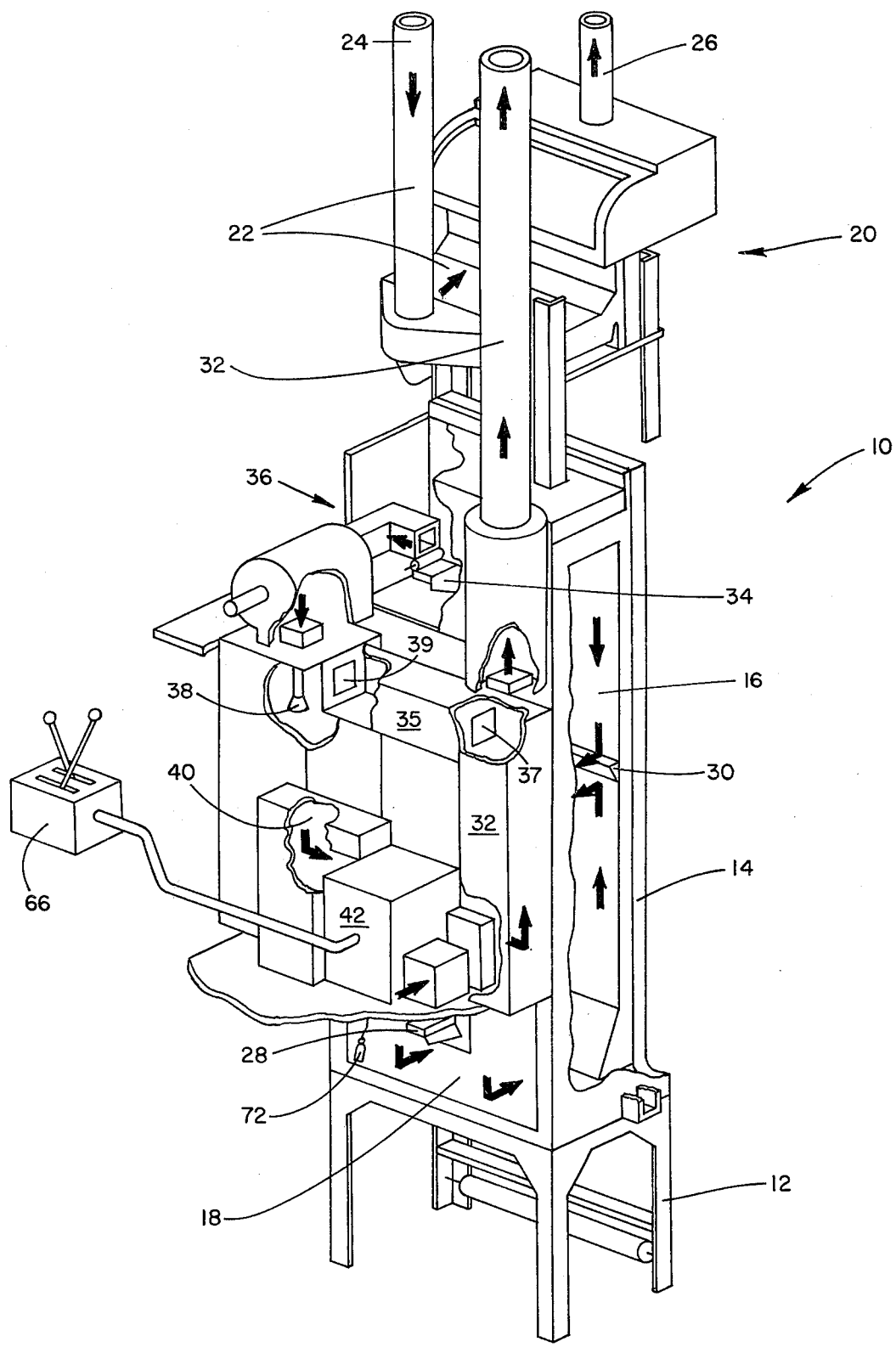
FIG. 1 is a perspective view of a furnace or oven utilizing the apparatus of the invention with portions of the oven or furnace cut away so as to illustrate the air flow therethrough.
Figure 2:
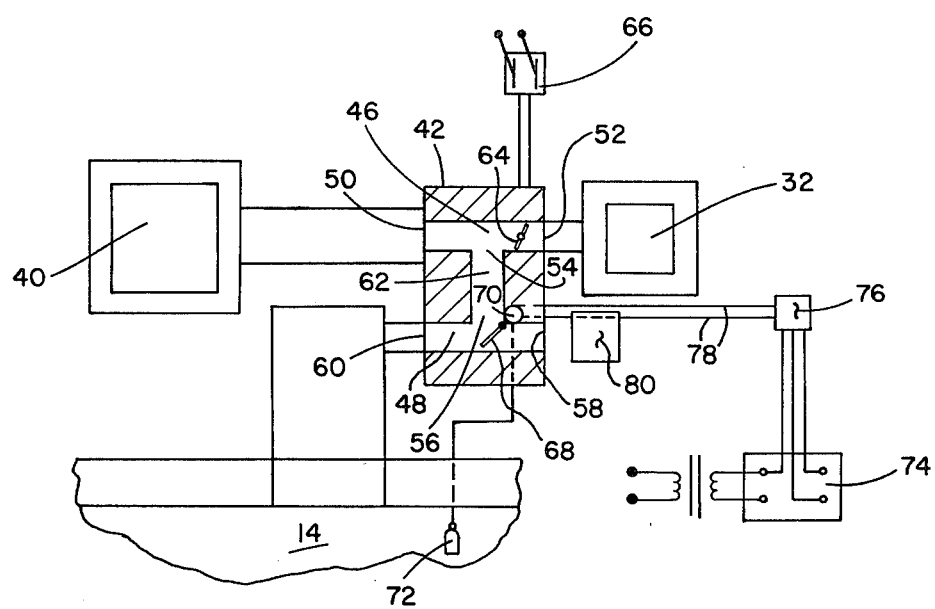
FIG. 2 is a cross-sectional view of the apparatus of the invention illustrated in FIG. 1 with the associated structure and the electrical control circuitry shown.

Referring to the Figures, a furnace is illustrated in FIG. 1 and is generally designated as 10. Furnace 10 includes a base 12 which supports the oven 14 of furnace 10. Oven 14 is divided into a top zone 16 and a bottom zone 18. Furnace 10 further includes a wire cooling assembly generally designated 20 having wire cooling chambers 22, a wire cooling intake 24, and a wire cooling exhaust 26.

Hot gas that is contained within bottom zone 18 is circulated by a bottom zone circulator fan 28 and travels upwardly in bottom zone 18 until it encounters a barrier 30 which diverts some of the gas towards oven exhaust 32. Hot gas that is not diverted continues to flow into top zone 16 wherein it is circulated by a top zone circulator fan 34. The gas circulates about top zone 16 until it encounters barrier 30 which diverts it to oven exhaust 32. Upon entering oven exhaust 32, the gas may either be exhausted up over exhaust 32 or be directed into conduit 35 depending on the position of damper 37. If directed into conduit 35, the gas will travel through gas burner 38 and then into gas burner chamber 40.

Hot gas contained within top zone 16 may also be diverted into conduit 36 whereby this gas is directed through gas burner 38 and then into gas burner chamber 40.

Hot gas contained within gas burner chamber 40 enters the recirculation device 42. In a specific embodiment this gas is at about 1300° F. The specific description of the operation of recirculation device 42 will be described hereinafter. However, generally speaking, the gas entering recirculation device 42 is either redirected back into bottom zone 18 of oven 14 or directed into the lower portion of oven exhaust 32, and, depending on the position of damper 37, is either exhausted from the furnace or directed into conduit 35.

Referring specifically to the structure and operation of recirculation device 42, recirculation device 42 is comprised of a solid body 44 having generally parallel first and second passageways 46 and 48, respectively, therethrough. Solid body 44 can be made from a heat resistant material such as a ceramic material or stainless steel. First passageway 46 has an entrance 50 and a pair of exits 52, 54. Second passageway 48 has a pair of inlets 56, 58 and an outlet 60. Solid body 44 further includes a third passageway 62 generally perpendicularly disposed with respect to the first and second passageways and which connects exit 54 of first passageway 46 and inlet 56 of second passageway 48.

A back pressure damper 64 made of a ceramic material or stainless steel is pivotally secured adjacent exit 52 of first passageway 46. Back pressure damper 64 is operatively connected to a manual control 66, whereby the movement of back pressure damper 64 can by manually controlled at a remote location. Thus, the volume of pre-heated gas flowing from the first to the second passageway can be controlled by manually positioning back pressure damper 64.

A mixing damper 68 made of a ceramic material or stainless steel is pivotally secured adjacent second inlet 58. Mixing damper 68 is controlled by operator 70 which is electrically connected to thermocouple 72 and motor 74 through interface module 76. This electrical circuit further includes a load resistor 78. By means of the electrical control circuitry previously described, the operation of mixing damper 68 is dependent upon the temperature in the bottom zone 18 of oven 14 as measured by thermocouple 72.

In operation, recirculated pre-heated gas enters device 42 via entrance 50 of first passageway 46. This pre-heated gas encounters back pressure damper 64 which has been manually positioned so as to control the volume of pre-heated gas passing through exit 52 into oven exhaust 32. Gas that does not pass past back pressure damper 64 is directed out of first passageway 46 through exit 54 into third passageway 62 and received into second passageway 48 through inlet 56. Thus, the volume of pre-heated gas directed toward second passageway 48 is determined by the positioning of back pressure damper 64.

During start-up damper 64 is adjusted until damper 68 is capable of maintaining the desired bottom zone temperature. At this time, damper 64 is maintained at this predetermined adjustment. In a specific embodiment of the recirculation device of the invention having passageways 46 and 48 of about 7"×30" used with a Michigan Oven; the pressure within the chamber 40 at this predetermined adjustment after start-up is about 0.8 to about 1" of water.

Mixing damper 68 controls the mixture of pre-heated gas and fresh air leaving the apparatus 42 via outlet 60 to be received in oven 14. The pre-heated gas component enters through inlet 56 and the fresh air component enters through fresh air inlet 80 and inlet 58. As previously mentioned, the position of mixing damper 68 is determined by the temperature within oven 14 as measured by thermocouple 72. Thus, the energy level (or temperature) of the gas entering the oven is controlled.

This feature of controlled entering gas temperature safeguards the oven from operating outside of a proper temperature range; and hence, enhances the operating efficiencies of the oven. The following data shows these efficiencies:

TABLE I

| Natural Gas Consumption/Day | Oven Temperature | |
|---|---|---|
| | Top Zone Temp. | Bottom Zone Temp. |
| Oven With Wing Rotatable Heat Exchanger | | |
| 25,500 ft.³ - March, 1979 | 790° F. | 455° F. |
| 25,000 ft.³ - April, 1979 | 810° F. | 455° F. |
| 26,000 ft.³ - May, 1979 | 825° F. | 465° F. |
| 25,000 ft.³ - June, 1979 | 800° F. | 450° F. |
| Oven With Recirculation Device of Invention | | |
| 20,000 ft.³ - March, 1981 | 770° F. | 440° F. |
| 15,000 ft.³ - April, 1981 | 790° F. | 460° F. |
| 17,000 ft.³ - May, 1981 | 810° F. | 500° F. |
| 20,000 ft.³ - June, 1981 | 775° F. | 500° F. |
| 20,000 ft.³ - Aug., 1981 | 850° F. | 400° F. |

This feature of the invention also reduces maintenance costs and operational down time generally caused by operation at improper temperatures.

Thus, it can be seen that applicant has provided an improved device for recirculating pre-energized fluid, and as embodied in the specific embodiment, a device for recirculating pre-heated gas. The device both controls the volume of gas exhausting through oven exhaust 32 via back pressure damper 64 as well as the mixture of pre-heated gas and fresh air recycled into oven 14 via mixing damper 68. The feature of the device whereby both manual and automatic controls are utilized provides for enhanced operational capabilities and improved performance characteristics is highly advantageous.

While there have been described above the principles of this invention in connection with specific apparatus, it is to be clearly understood that this description is made only by way of example and not as a limitation to the scope of the invention.

What is claimed is:

1. An oven recirculation device for recirculating a selected volume of preheated gas exhausted from a burner chamber together with fresh air through an oven and back to the burner chamber, the device comprising a first passageway having an entrance adapted to be connected to said burner chamber, a first exit adapted to be connected to said oven, and a second exit adapted to be connected to an oven exhaust, a second passageway having a first inlet and a second inlet and an outlet, said outlet adapted to be connected to said oven, a third passageway connecting said first exit and said first inlet, a fresh air inlet communicating with said second inlet, a back pressure damper adjacent said second exit, a control connected to said back pressure damper so that the volume of preheated gas flowing through said oven into said burner chamber may be selectively determined, and a mixing damper adjacent said second inlet, an automatic temperature-dependent control connected to said mixing damper so that the fresh air mixing with the preheated gas entering the burner chamber is dependent upon the temperature in the oven.

2. The device of claim 1 wherein said automatic control includes a thermocouple positioned within the oven, an operator connected to said mixing damper, and a relay connecting said thermocouple and said operator so that the movement of said mixing damper is dependent upon the temperature in the oven as measured by said thermocouple.

3. The device of claim 1 wherein said first passageway, said second passageway and said third passageway are made of ceramic material.

4. The device of claim 1 wherein said back pressure damper is made of ceramic material, and said mixing damper is made of ceramic material.

5. The recirculation device of claim 1 wherein said back pressure damper control is a manual control.

* * * * *